United States Patent
Yuen

(10) Patent No.: US 8,382,596 B2
(45) Date of Patent: Feb. 26, 2013

(54) LOW NOISE FLEXIBLE SHAFT

(75) Inventor: Tat M. Yuen, Old Bridge, NJ (US)

(73) Assignee: S. S. White Technologies Inc., Piscataway, NJ (US)

(*) Notice: Subject to any disclaimer, the term of this patent is extended or adjusted under 35 U.S.C. 154(b) by 76 days.

(21) Appl. No.: 12/947,854

(22) Filed: Nov. 17, 2010

(65) Prior Publication Data

US 2011/0065517 A1    Mar. 17, 2011

Related U.S. Application Data

(63) Continuation-in-part of application No. 12/708,816, filed on Feb. 19, 2010, now Pat. No. 8,162,761.

(60) Provisional application No. 61/166,261, filed on Apr. 3, 2009.

(51) Int. Cl.
    *F16D 3/79* (2006.01)
(52) U.S. Cl. .................. 464/52; 464/91; 403/383
(58) Field of Classification Search .......... 464/52, 464/53, 89–91, 183; 403/225, 226, 383; 74/500.5, 502.6
See application file for complete search history.

(56) References Cited

U.S. PATENT DOCUMENTS

| | | | | |
|---|---|---|---|---|
| 2,573,361 A | * | 10/1951 | Rodgers, Jr. et al. | ..... 464/183 X |
| 3,389,579 A | | 6/1968 | Werner et al. | |
| 4,411,168 A | | 10/1983 | Yoshifuji | |
| 4,849,038 A | | 7/1989 | Burghardt et al. | |
| 5,245,887 A | * | 9/1993 | Tanaka et al. | ............... 74/502.5 |
| 5,353,626 A | * | 10/1994 | Davidson et al. | ........... 74/502.6 |
| 5,636,551 A | * | 6/1997 | Davidson et al. | ........ 74/500.5 X |
| 6,464,588 B1 | | 10/2002 | Rupp | |
| 7,717,795 B2 | | 5/2010 | Mellor | |
| 2012/0021841 A1 | * | 1/2012 | Yuen et al. | ..................... 464/89 |

FOREIGN PATENT DOCUMENTS

EP        1286065 A1    2/2003

* cited by examiner

*Primary Examiner* — Gregory Binda
(74) *Attorney, Agent, or Firm* — Arthur L. Lessler

(57) ABSTRACT

A rotary flexible shaft for coupling between driving and driven member having female couplings has ends of noncircular cross-section. A strand of compressible material such as flocked yarn is helically wrapped around each end so as to leave spaces between turns which expose portions of the lateral surfaces of the ends. A coating of a silicone adhesive or other elastomer, or of a highly ductile material such as polytetrafluoroethylene, covers and is adherent to the strands and the exposed portions of the lateral surfaces of the shaft ends. Instead of a strand, the compressible material may constitute spaced ridges, islands, and/or protuberances adhering to the shaft ends.

8 Claims, 1 Drawing Sheet

LOW NOISE FLEXIBLE SHAFT

CROSS-REFERENCE TO RELATED APPLICATIONS

This application is a continuation-in-part of U.S. patent application Ser. No. 12/708,816 filed Feb. 19, 2010, now U.S. Pat. No. 8,162,761, and entitled Low Interface Noise Rotary Shaft Tips which claims the benefit of U.S. Provisional Application Ser. No. 61/166,261 filed Apr. 3, 2009 and entitled Low Interface Noise Rotary Shaft Tips.

BACKGROUND OF THE INVENTION

The present invention relates to rotating flexible shafts having tips or ends adapted to engage mating elements of driving or driven members; and is particularly suited for use with, but not limited to wire wound flexible shafts.

Rotary shafts for transmitting torque typically have square ends adapted to engage square recesses of mating driving and driven parts. Rotary flexible shafts commonly used to transmit torque from a motor to adjust a seat in a motor vehicle, for example, are of wire wound construction and may, but need not, have helical square ends as shown in U.S. Pat. No. 6,464,588 to Rupp.

Typically the shaft and its male ends are steel and each female mating part is steel or plastic. To insure assembly will always be possible, manufacturing tolerances are set so that the maximum dimensions of the shafts are smaller than the minimum dimensions of the recesses in the mating parts. The interface is therefore always somewhat loose and can be noisy at operating rotational speeds.

It is known to add a layer of deformable material to the interface between the shaft ends and the mating recesses that dampens contact and reduces clearance, and thus functions to reduce noise. This noise reduction material, however, also has dimensional tolerances, and is subject to wear.

In European Patent Application Serial No. EP 1286065 of Otto Suhner AG (inventors Theo Eichenberger et al.) entitled Flexible Shaft With Noise Reducing Component, a flexible shaft for adjusting a motor vehicle seat has a surrounding casing, and noise is reduced by incorporating a relatively large diameter flocked yarn wire in the outer wire layer, so that the yarn helps to reduce noise due to contact between the rotating outer wire layer and the surrounding casing.

In U.S. Pat. No. 3,389,579 to Werner et al. entitled Shaft Guided In A Protection Tube, noise isolation between a flexible shaft and a surrounding protection tube is provided by adhering short elastic fibers to the outer surface of the shaft or the inner surface of the protection tube, to form a brush-like layer between the shaft and tube.

In U.S. Pat. No. 4,411,168 to Yoshifuji entitled Inner Cable, noise due to contact between a push-pull wire wound flexible cable and a surrounding conduit is reduced by winding a hollow elastic member on the cable core between wire teeth also wound on the core, the elastic member having a greater diameter than the teeth so that only the elastic member contacts the inner surface of the conduit, thus reducing noise when the cable is moved longitudinally.

In U.S. Pat. No. 4,849,038 to Burghardt entitled Method For Depositing An Interlining On A Pitched Cable For Reducing Friction And Noise, a filament flocked with abrasion resistant material is wound or deposited on a wire wound flexible shaft, interleaved with the wire of the outer layer of the shaft.

In U.S. Pat. No. 7,717,795 to Mellor, a deformable polytetrafluoroethylene sheath is applied over the ends of a flexible shaft to reduce noise and vibration due to friction and relative movement between the shaft ends and mating recesses.

The sum of the maximum dimensions of the noise reducing material and the maximum dimensions of the shaft must still be such that the shaft end and the noise dampening material can be installed in a mating part of the smallest possible manufactured dimensions. On the other hand, the sum of the minimum dimensions of the noise reducing material and the minimum dimensions of the shaft must fit within a mating recess of the largest possible manufactured dimensions with little or no clearance.

Therefore the noise reducing material must be such that it can be easily compressed or displaced during insertion of the shaft assembly into the mating recess, while exhibiting resistance to wear.

Accordingly, an object of the present invention is to provide a rotary flexible shaft that exhibits low rotational noise when coupled between driving and driven members.

SUMMARY OF THE INVENTION

According to the invention a rotary flexible shaft having at least one end of noncircular cross-section has a strand of compressible material wrapped around that end in such a way as to expose portions of the lateral surface of that end; with a coating comprising an elastomer or highly ductile material overlying and adhering to said strand and the adjacent exposed surface of said end. Alternatively, the lateral surface or surfaces of the shaft end may have spaced ridges or other protuberances of compressible material secured thereto and covered by a layer of elastomeric or highly ductile material.

IN THE DRAWING

DETAILED DESCRIPTION

Figure 1:
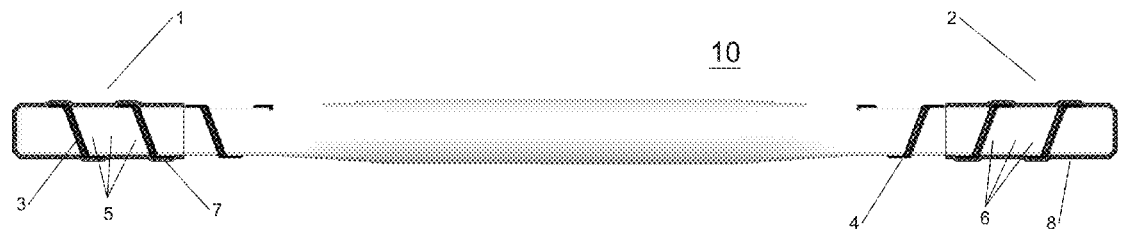
FIG. 1 is a front elevation view of a rotary flexible shaft according to a first embodiment of the invention.
Figure 2:
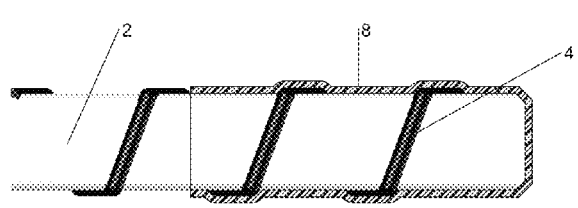
FIG. 2 is a front elevation view of an end of the shaft shown in FIG. 1.
Figure 3:
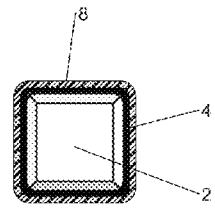
FIG. 3 is a right side elevation view of the shaft end shown in FIG. 2.

As shown in FIGS. 1 to 3, a generally cylindrical flexible shaft 10 has ends 1 and 2 of square cross-section. The shaft is made of steel wires helically wound on a mandrel wire and the ends are formed to have the desired cross-sectional dimensions.

Strands 3 and 4 are helically wound in helical grooves on the shaft ends 1 and 2 respectively, extending above the shaft end surfaces and leaving spaces between adjacent turns so that portions 5, 6 of the lateral surfaces of the ends are exposed. The grooves help to retain the strands in position when the shaft ends are inserted into or removed from mating recesses in driving or driven members.

Coatings comprising layers 7, 8 of an elastomer such as a silicone adhesive overlie and are adherent to the strands 3, 4 and the exposed portions of the lateral surfaces of the shaft ends. The strands preferably comprise flocked yarn, but may comprise a filament or thread of another compressible material such as nylon.

The helically wound flocked yarn on the shaft ends helps to provide a consistent range of coating thickness when the silicone adhesive is applied, and augments adhesion of the coating to the shaft ends, as well as providing improved resistance of the coating to peel, tear and wear.

The coatings may alternatively comprise any elastomer or highly ductile material of similar properties and may be applied by any suitable process, such as dipping or spraying. The elastomer or highly ductile material may be applied to one or both ends of the shaft, or the entire length of the shaft.

When a shaft end portion 1 or 2 is inserted into a mating recess of a driving or driven member (not shown), the elastomeric or highly ductile coating and underlying strand are compressed to provide a tight fit between the shaft end and the recess, which results in an interface exhibiting a durable interference fit which minimizes noise generated by relative movement between the mating surfaces when the shaft is rotated.

The shaft end portion need not be unitary with the main part of the shaft, but may be a fitting attached to the adjacent end of the shaft.

Multiple strands instead of a single strand may be wound on each end of the shaft.

Instead of being square, the end portion cross-section of the shaft may have any desired noncircular configuration.

Figure 4:
FIG. 4 is a front elevation view of a rotary flexible shaft according to a second embodiment of the invention.
Figure 5:
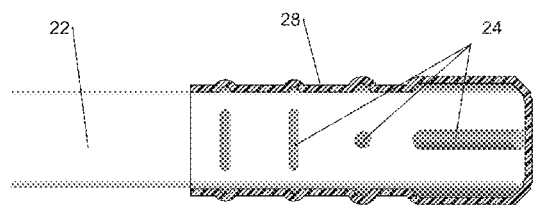
FIG. 5 is a front elevation view of an end of the shaft shown in FIG. 4.
Figure 6:
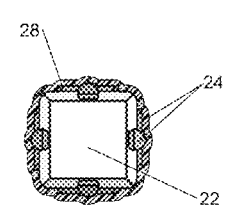
FIG. 6 is a right side elevation view of the shaft end shown in FIG. 5.

As shown in FIGS. 4 to 6, instead of winding flocked yarn on the shaft ends, elastomeric flocking or other elastomeric material, or highly ductile material may be deposited thereon using glue, for example by electrostatic means known in the art, to form spaced adherent compressible ridges, islands or other protuberances of compressible material secured to the lateral surface or surfaces of the shaft end and covered by a layer of elastomeric material, or a highly ductile material such as polytetrafluoroethylene. The ridges, islands and/or protuberances are raised regions which are adherent to the underlying shaft end and are compressible. They are preferably, but need not be, also resilient.

In order to help the ridges, islands or other protuberances remain in place when the shaft ends are inserted into or removed from mating recesses in driving or driven members, they are preferably disposed in corresponding channels or dimples in the shaft end surfaces, wherein they protrude above the shaft end surfaces.

The generally cylindrical flexible shaft 20 has ends 21 and 22 of square cross-section. The shaft is made of steel wires helically wound on a mandrel wire and the ends are formed to have the desired cross-sectional dimensions.

Ridges, islands and/or protuberances 23, 24, preferably comprising flocking, are disposed on and adherent to the shaft ends 21 and 22 respectively, leaving spaces between adjacent raised regions so that portions 25, 26 of the lateral surfaces of the ends are exposed.

Coatings comprising layers 27, 28 of an elastomer such as a silicone adhesive or highly ductile material such as polytetrafluoroethylene tape overlie and are adherent to the strands 23, 24 and the exposed portions of the lateral surfaces of the shaft ends.

The flocked yarn raised regions on the shaft ends help to provide a consistent range of coating thickness when the silicone adhesive is applied, and augment adhesion of the coating to the shaft ends, as well as providing improved resistance of the coating to peel, tear and wear.

The coatings may alternatively comprise any elastomer or highly ductile material of similar properties and may be applied by any suitable process, such as dipping or spraying. The elastomer or highly ductile material may be applied to one or both ends of the shaft, or the entire length of the shaft. Alternatively, polytetrafluoroethylene tape may be wound on the shaft ends.

When a shaft end portion 1, 2, 21 or 22 is inserted into a mating recess of a driving or driven member (not shown), the elastomeric or highly ductile coating and underlying strand or raised regions are compressed to provide a tight fit between the shaft end and the recess, which results in an interface exhibiting a durable interference fit which minimizes noise generated by relative movement between the mating surfaces when the shaft is rotated.

The adherent ridges, islands or other protuberances 23, 24 may be disposed randomly or in a pattern so as to leave spaces in which portions of the lateral surfaces of the ends are exposed; with the elastomer or highly ductile coating or layer being applied so as to adhere to the ridges or other protuberance and to the exposed end portion surfaces. The raised ridges, islands or protuberances may have any desired shape or shapes.

I claim:

1. A rotary flexible shaft having
   at least one end of noncircular cross-section with a strand of compressible material wrapped around that end in such a way as to expose portions of the lateral surface of that end between the turns of the strand, and
   a coating comprising an elastomer or ductile material overlying and adherent to said strand and the adjacent exposed surface portions of said shaft end.

2. The shaft according to claim 1, wherein said elastomer or ductile material is a silicone adhesive.

3. The shaft according to claim 2, wherein said strand comprises flocked yarn.

4. A rotary flexible shaft having
   at least one end of noncircular cross-section with raised regions of compressible material secured to the lateral surface of that end in such a way as to expose portions of the lateral surface of that end between the raised regions, and
   an elastomeric or ductile material coating or layer overlying and adhering to said raised regions and the adjacent exposed surface of said shaft end.

5. The shaft according to claim 4, wherein said elastomer or ductile material is a silicone adhesive.

6. The shaft according to claim 5, wherein said raised regions comprise flocking.

7. The shaft according to claim 4, wherein said coating or layer comprises polytetrafluoroethylene tape.

8. A rotary flexible shaft having
   at least one end of noncircular cross-section with spaced ridges, islands or protuberances comprising compressible material secured to that end, and
   an elastomeric or ductile material coating or layer overlying and adhering to said raised regions and the adjacent surface of said shaft end.

* * * * *